United States Patent [19]

Gross et al.

[11] Patent Number: 5,650,903
[45] Date of Patent: Jul. 22, 1997

[54] SUPERCONDUCTING-MAGNET ELECTRICAL CIRCUIT HAVING VOLTAGE AND QUENCH PROTECTION

[75] Inventors: Dan Arthur Gross, Niskayuna, N.Y.; David Charles Mack, Waukesha, Wis.; Timothy John Havens, Florence, S.C.

[73] Assignee: General Electric Company, Schenectady, N.Y.

[21] Appl. No.: 565,140

[22] Filed: Nov. 30, 1995

[51] Int. Cl.$^6$ ...................................................... H02H 7/00
[52] U.S. Cl. .............................. 361/19; 361/58; 361/141
[58] Field of Search .................................. 361/19, 10, 11, 361/58, 141; 336/DIG. 1; 335/216, 296, 299; 174/125.1; 505/825, 850, 879

[56] References Cited

U.S. PATENT DOCUMENTS

| | | | |
|---|---|---|---|
| 4,680,666 | 7/1987 | Rios | 361/141 |
| 4,764,837 | 8/1988 | Jones | 361/19 |
| 4,956,740 | 9/1990 | Williams | 361/19 |
| 5,333,087 | 7/1994 | Takechi et al. | 361/19 |

OTHER PUBLICATIONS

U.S. Patent Application Ser. No. 08/514,332 filed Aug. 11,1995, by Lembit Salasoo, entitled "Electrical Circuit for Protecting a Superconducting Magnet During a Quench".

Primary Examiner—Jeffrey A. Gaffin
Assistant Examiner—Ronald W. Leja
Attorney, Agent, or Firm—Douglas E. Erickson; Marvin Snyder

[57] ABSTRACT

A superconductive-magnet electrical circuit includes a superconductive-coil assemblage having first, second, third, and fourth coil portions sequentially coupled together in series. A bipolar current-bypass electrical-circuit element (such as a pair of diodes opposingly coupled together in parallel) has:

an impedance less than generally one-thousandth that of the coil portions; a first terminal coupled in parallel with the first and second coil portions; and a second terminal coupled in parallel with the third and fourth coil portions. A localized quench in one coil portion is quickly shared with the other coil portions to reduce damage from the quench. A resistor has a lead coupled in parallel with the second and third coil portions to limit quench voltages.

10 Claims, 3 Drawing Sheets

SUPERCONDUCTING-MAGNET ELECTRICAL CIRCUIT HAVING VOLTAGE AND QUENCH PROTECTION

BACKGROUND OF THE INVENTION

The present invention relates generally to superconductive magnets and more particularly to a superconducting-magnet electrical circuit which protects its superconductive-coil assemblage from damage during a quench.

Superconducting magnets are those superconducting devices which have a superconductive-coil assemblage and include, but are not limited to, magnetic resonance imaging (MRI) systems for medical diagnosis, superconductive rotors for electric generators and motors, and magnetic levitation devices for train transportation. Magnets wound of superconductive material offer the advantage that they can carry significant electrical currents without suffering any power loss due to the fact that superconductive windings offer no resistance to electrical current flow. As a consequence of this zero resistance property, wire or tape that is quite small is capable of carrying very large currents in the superconducting state. This property has been especially beneficial in the construction of MRI magnets because they require very high static magnetic fields.

When designing superconducting magnets, however, one must consider the possibility that the superconducting wire or tape may "lose" its superconducting capabilities at some point and become resistive. This transformation from a superconducting state to a resistive state is known as "quenching" and may be caused, for example, by loss of the cryogenic cooling needed for superconductivity to occur. In the event that the superconductive wire becomes resistive, the wire that normally carries the large electrical currents with no resistive heating now generates both high voltages and high power losses. These voltages and power losses can be quite damaging to the magnet if they are allowed to become too large or remain too localized.

As a consequence of the above, magnets are designed such that the "quench" is propagated as quickly as possible after initiation; that is, if some area of the winding quenches, the magnet is designed so that the entire winding becomes resistive as soon as possible. This design criteria results in lower voltages and lower peak temperatures since the stored energy of the magnet is dispersed throughout a larger mass. Known quench protection techniques include using a quench-detection signal (from the electrical center of the superconductive coil assemblage of the superconductive device) directly supplying an energy dump resistor or directly powering a wide-area electrical heater located near the superconductive coil assemblage of the superconductive device. Such known techniques take a relatively long time to work. It is also known to amplify the quench-detection signal outside the cryostat, but this raises issues of reliability and additional cryostat penetrations.

SUMMARY OF THE INVENTION

It is an object of the invention to provide a superconducting-magnet electrical circuit having quench protection for its superconductive-coil assemblage.

The superconductive-magnet electrical circuit of the invention contains a superconductive-coil assemblage including first, second, third, and fourth superconductive-coil portions together having a total electrical impedance. The second superconductive-coil portion is coupled in series with and between the first and third superconductive-coil portions, and the third superconductive-coil portion is coupled in series with and between the second and fourth superconductive portions. The electrical circuit also contains a bipolar current-bypass electrical-circuit element (such as first and second diodes opposingly coupled together in parallel) having a first terminal, a second terminal, and an electrical impedance less than generally one-thousandth of the total electrical impedance of the four superconductive-coil portions of the superconductive-coil assemblage. The bipolar current-bypass electrical-circuit element is coupled to the superconductive-coil assemblage only through the first and second terminals. The first terminal is only coupled to the superconductive-coil assemblage in parallel with the first and second superconductive-coil portions, and the second terminal is only coupled to the superconductive-coil assemblage in parallel with the third and fourth superconductive-coil portions. The electrical circuit further contains a resistor having a first lead and a second lead, wherein the first lead is coupled in parallel with the second and third superconductive-coil portions. Preferably, the electrical circuit additionally contains a bipolar semi-conductor switch (such as third and fourth diodes opposingly coupled together in parallel) having two electrodes, wherein the second lead of the resistor is coupled in series with one of the two electrodes.

Several benefits and advantages are derived from the invention. At cryogenic-cooling temperatures, diodes only pass electric current in the forward direction for voltages associated with a quench event. Thus, for example, the preferred first and second diodes of the superconductive-magnet electrical circuit of the invention together function to ensure that a localized quench in the first or second superconductive-coil portions of the circuit will be quickly shared with the third and fourth superconductive-coil portions of the circuit which lessens the damaging impact on the first or second superconductive-coil portions. It is noted that the results are the same for a quench starting in the third or fourth superconductive-coil portions. The resistor limits quench voltages which is desirable in applications where available electrical insulation is limited. The preferred third and fourth diodes together function to ensure that current will be lost through the resistor only during a quench event and not during normal superconductive operation of the superconductive-coil assemblage.

BRIEF DESCRIPTION OF THE DRAWINGS

The accompanying drawings illustrate a preferred embodiment of the present invention wherein.

DETAILED DESCRIPTION OF THE INVENTION

Figure 1:
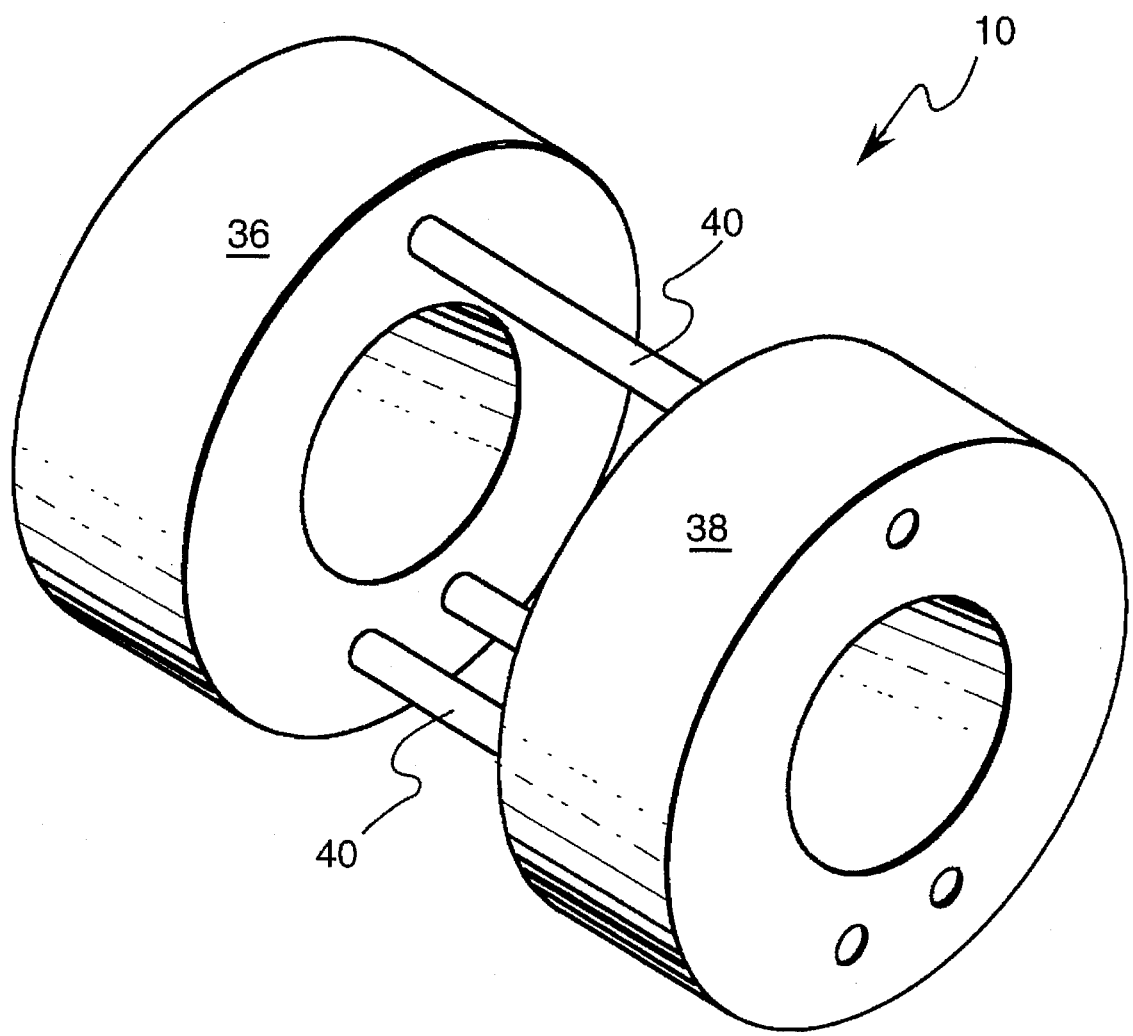
FIG. 1 is a perspective view of an open MRI magnet (with the magnet floor mount omitted for clarity) which includes the superconductive-magnet electrical circuit of the invention.

Referring now to the drawings, FIG. 1 shows a preferred superconducting magnet 10 which utilizes the superconductive-magnet electrical circuit of the invention. A preferred physical embodiment of the superconductive-magnet electrical circuit 12 of the invention is shown in FIG.

Figure 3:
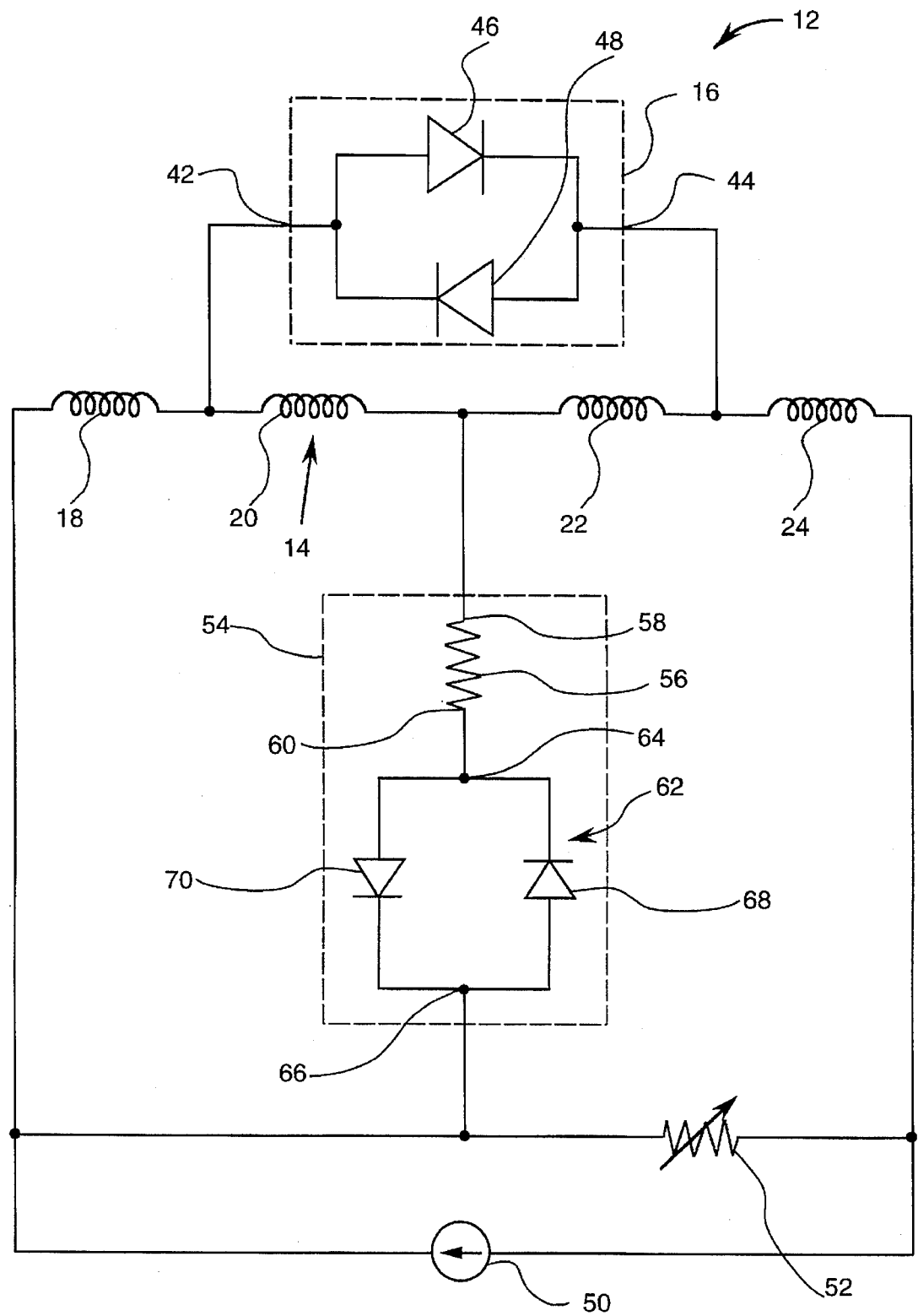
FIG. 3 is a more-detailed schematic circuit diagram of the electric circuit physically shown in FIG. 2.

2, and a preferred, more-detailed schematic circuit diagram of the circuit 12 is shown in FIG. 3. The circuit 12 contains a superconductive-coil assemblage 14 and a bipolar current-bypass electrical-circuit element 16.

The superconductive-coil assemblage 14 includes first, second, third, and fourth superconductive-coil portions 18, 20, 22, and 24 together having a total electrical impedance. For purposes of describing the invention, when the terminology "electrical impedance" is used in reference to any element (or group of elements) of the circuit 12, it refers to the conducting electrical impedance of that element (or group of elements) at the operating superconducting temperature (e.g., ten Kelvin) of the superconductive-coil assemblage 14. It is noted that some elements, such as diodes, have forward bias voltages which must be exceeded before they can conduct electric current, and they have very large "non-conducting" electrical impedances and very small "conducting" electrical impedances. The second superconductive-coil portion 20 is coupled in series with and between the first and third superconductive-coil portions 18 and 22, and the third superconductive-coil portion 22 is coupled in series with and between the second and fourth superconductive-coil portions 20 and 24. Preferably, the first and second superconductive-coil portions 18 and 20 together define a generally annular-shaped first superconductive coil 26 having a generally longitudinally-extending first axis 28, and the third and fourth superconductive-coil portions 22 and 24 together define a generally annular-shaped second superconductive coil 30 having a generally longitudinally-extending second axis 32. In an exemplary enablement, the second superconductive coil 30 is longitudinally spaced apart from the first superconductive coil 26, and the second axis 32 is generally coaxially aligned with the first axis 28. In a preferred embodiment, the superconductive-coil assemblage 14 is a magnetic resonance imaging (MRI) superconductive-coil assemblage 14 having an imaging volume 34 located generally longitudinally midway between the first and second superconductive coils 26 and 30. The imaging volume 34 typically is generally spherical in shape.

Figure 2:
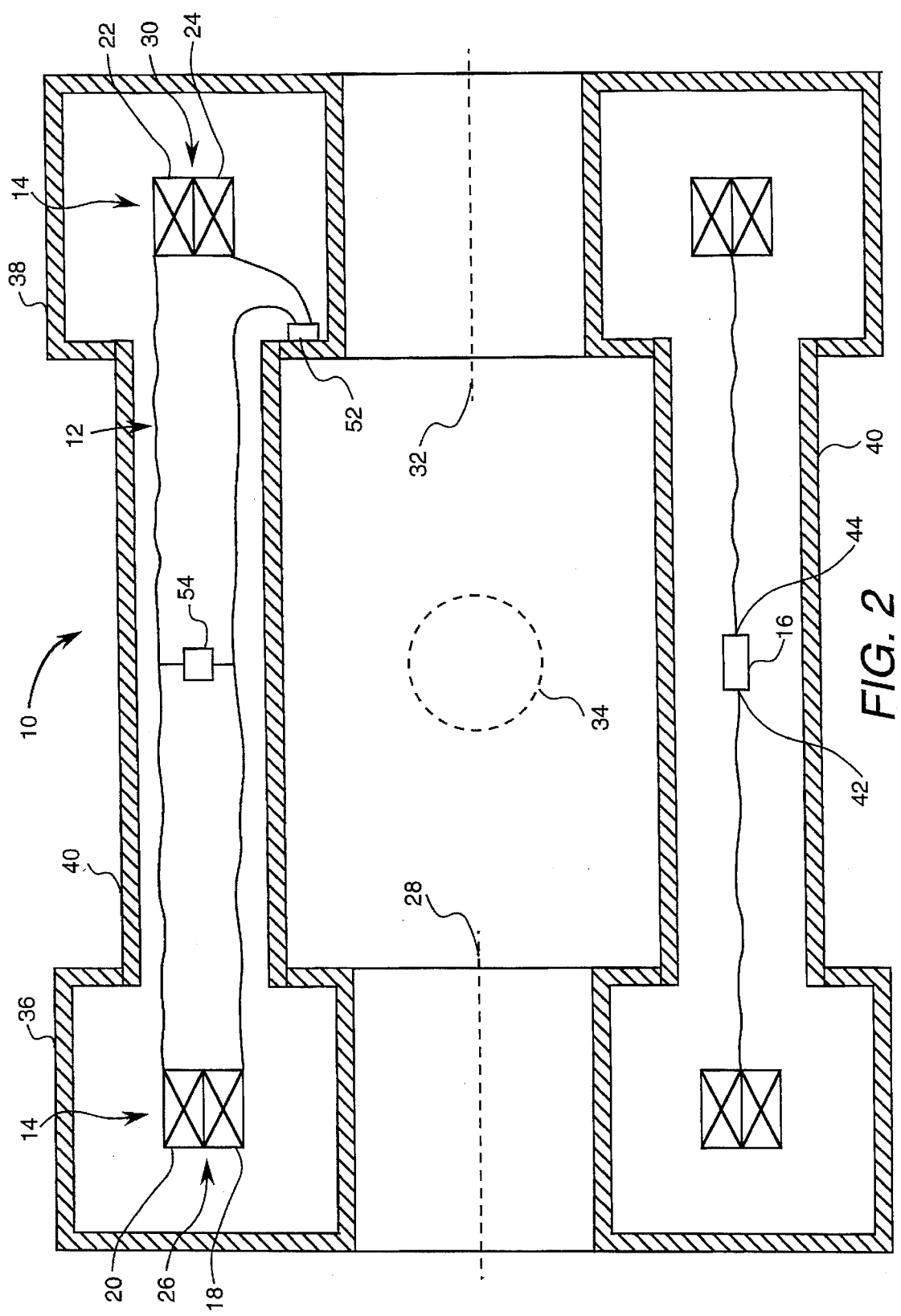
FIG. 2 is a schematic cross-sectional side-elevational view of the open MRI magnet of FIG. 1 showing a preferred physical embodiment of the superconductive-magnet electrical circuit of the invention.

Preferably, the superconducting magnet 10 is an open type magnet (as shown in FIGS. 1 and 2), but the circuit 12 of the invention is equally applicable to other types of superconductive magnets including, but not limited to, closed magnets, as can be appreciated by the artisan. It is noted that the first superconductive coil 26 is generally surrounded by a generally toroidal-shaped first housing 36, that the second superconductive coil 30 is generally surrounded by a generally toroidal-shaped second housing 38, and that the two housings 36 and 38 preferably are longitudinally separated by a plurality of posts 40 each having a first end hermetically attached to the first housing 36 and having a second end hermetically attached to the second housing 38. The housings 36 and 38 and the posts 40 together define a single vacuum enclosure. It is noted that the superconductive coils 26 and 30 are supported on coil forms (omitted from the figures for clarity). Preferably, the superconductive-coil assemblage 14 is wound from a monolithic length of insulated, copper-stabilized Nb-Sn superconductive tape or wire and is cooled to below its critical temperature (i.e., the temperature needed for superconductivity to occur) by a cryogenic liquid (such as liquid helium) and/or by a cryocooler coldhead (e.g., a coldhead of a Gifford-McMahon cryocooler). Such cooling apparatus, as well as any required thermal shield(s), are well known in the art, do not form part of the circuit 12 of the invention, and are not shown in the figures. It is noted that magnet elements of different temperatures would be separated by thermally-insulative spacers.

In a first preferred construction (shown in FIG. 2), the second superconductive-coil portion 20 is disposed radially outward of, and is radially superimposed on, the first superconductive-coil portion 18, and the third superconductive-coil portion 22 is disposed radially outward of, and is radially superimposed on, the fourth superconductive-coil portion 24. In a second (but less) preferred construction (shown in FIG. 3), the first superconductive-coil portion 18 is disposed longitudinally adjacent to the second superconductive-coil portion 20, and the fourth superconductive-coil portion 24 is disposed longitudinally adjacent to the third superconductive-coil portion 22. Preferably, the first superconductive coil 26 is generally identical to the second superconductive coil 30, the first and fourth superconductive-coil portions 18 and 24 are generally identical, and the second and third superconductive-coil portions 20 and 22 are generally identical.

The bipolar current-bypass electrical-circuit element 16 of the circuit 12 of the invention has a first terminal 42, a second terminal 44, and an electrical impedance less than generally one-thousandth of the total electrical impedance of the four superconductive-coil portions 18 to 22 of the superconductive-coil assemblage 14. As an example, and without limitation, a typical superconducting magnet 10 may have a generally 0.5 Tesla twelve-inch spherical imaging volume, the superconductive-coil portions 18–24 together may have a total electrical impedance of generally 100 (one hundred) ohms in the normal state, and the bipolar current-bypass electrical-circuit element 16 has an electrical impedance of generally 0.010 (one-hundredth) ohm. The bipolar current-bypass electrical-circuit element 16 is coupled to the superconductive-coil assemblage 14 only through the first and second terminals 42 and 44. The first terminal 42 is only coupled to the superconductive-coil assemblage 14 in parallel with the first and second superconductive-coil portions 18 and 20, and the second terminal 44 is only coupled to the superconductive-coil assemblage 14 in parallel with the third and fourth superconductive-coil portions 22 and 24.

In a first preferred construction, shown in FIG. 3, the bipolar current-bypass electrical-circuit element 16 preferably comprises (more preferably consists essentially of, and most preferably consists of) first and second diodes 46 and 48 opposingly coupled together in parallel. Other examples of a bipolar current-bypass electrical-circuit element capable of having low impedance (i.e., an electrical impedance less than generally one-thousandth that of the four coil portions 18 to 24 of the superconductive-coil assemblage 14) include, without limitation, a resistor, a pair of SCR's (silicon controlled rectifiers) opposingly coupled together in parallel, a length of superconductive shunt, etc., as is known to those skilled in the art. With the first preferred construction, it is desired that the first and second diodes 46 and 48 are generally identical, with the first diode 46 having a forward bias voltage of at least generally five volts (and preferably of generally ten volts) at a temperature of generally ten Kelvin. It is noted that since the voltage within the superconductive-coil assemblage 14 is considered to be zero during steady-state superconductive operation, the diodes 46 and 48 can only conduct during a quench event when high resistive voltages are encountered. The forward bias voltage prevents the diodes 46 and 48 from "leaking" during normal superconductive operation of the superconducting magnet 10. However, such "leaking", which is present when, for example, a resistor is used as the bipolar current-bypass electrical-circuit element 16, is relatively small and may be tolerated in many magnet applications.

The circuit 12 desirably further (and conventionally) contains a power supply (i.e., current supply) 50 for ramping up the superconductive-coil assemblage 14 and a superconductive switch 52. The superconductive switch 52 is used to transfer between a persistent superconducting operating mode and a non-persistent superconducting operating mode. Typically the superconductive switch 52 is used to start up superconductive operation of the superconducting magnet 10 and to purposely run down such superconductive operation.

Preferably, the circuit 12 is used as the only magnet quench protecting means. However, the circuit 12 may be combined with other quench-protecting means. For example, the circuit 12 may be combined with an energy dump resistor and/or a wide-area heater, as can be appreciated by those skilled in the art. It is noted that, in many MRI superconducting magnets, quench protection must operate in approximately two seconds after the localized magnet quench spontaneously starts. However, the potentially-damaging temperatures and stresses applied by the localized quench to the superconductive-coil assemblage 14 increase very rapidly with increasing protection system operating time so that every tenth of a second speed-up in the protection system operation provides a significant benefit in avoiding damage to the superconductive magnet coil assemblage 14.

The superconductive-magnet electrical circuit 12 of the invention also contains a voltage-clamping device 54. The voltage-clamping device 54 includes a resistor 56 having a first lead 58 and a second lead 60, wherein the first lead 58 is coupled in parallel with the second and third superconductive-coil portions 20 and 22. Preferably, the first lead 58 is only coupled to the superconductive-coil assemblage 14 in parallel with the second and third superconductive-coil portions 20 and 22. The resistor 56 acts as to limit the voltage seen in the superconducting-coil assemblage 14 during a quench event. This is important in magnet designs whose electrical insulation is not adequate to handle the high voltages experienced by the electrical circuit 12 of the invention during a quench event. In a preferred construction, the second lead 60 of the resistor 56 is coupled with the first and fourth superconductive-coil portions 18 and 24. Preferably, the second lead 60 is only coupled to the superconductive-coil assemblage 14 in parallel with the first and fourth superconductive-coil portions 18 and 24. In a preferred design, the superconductive-coil assemblage 14 has a critical-design voltage and an operating current, and the resistor 56 has a resistance less than the critical-design voltage divided by the operating current, as can be appreciated by the artisan. As an example, and without limitation, a typical superconductive-coil assemblage 14 of the previously-mentioned typical superconducting magnet 10 may have a critical-design voltage of generally 500 volts and an operating current of generally 100 amperes, with the resistor 56 having a resistance of generally 5 ohms. Experimental results have shown quench voltages in the superconductive-coil assemblage 14 of only generally 300 volts with the resistor 56 in the electrical circuit 12 versus voltages of generally 1200 volts without the resistor 56 in the electrical circuit 12.

Preferably, the voltage-clamping device 54 also includes a bipolar semi-conductor switch 62 having two electrodes 64 and 66, wherein the second lead 60 of the resistor 56 is coupled in series with one 64 of the two electrodes 64 and 66. In a desired construction, the other 66 of the two electrodes 64 and 66 is coupled in parallel with the first and fourth superconductive-coil portions 18 and 24. Preferably, the other 66 of the two electrodes 64 and 66 is only coupled to the superconductive-coil assemblage 14 in parallel with the first and fourth superconductive-coil portions 18 and 24.

In a first preferred construction, shown in FIG. 3, the bipolar semi-conductor switch 62 preferably comprises (more preferably consists essentially of, and most preferably consists of) third and fourth diodes 68 and 70 opposingly coupled together in parallel. Other examples of a bipolar semi-conductor switch include, without limitation, a pair of SCR's (silicon controlled rectifiers) opposingly coupled together in parallel, etc., as is known to those skilled in the art. With the first preferred construction, it is desired that the third and fourth diodes 68 and 70 are generally identical, with the third diode 68 having a forward bias voltage of between generally two volts and generally ten volts (and preferably of generally ten volts) at a temperature of generally ten Kelvin. It is noted that since the voltage within the superconductive-coil assemblage 14 is considered to be zero during steady-state superconductive operation, the diodes 68 and 70 can only conduct during a quench event when high resistive voltages are encountered. The forward bias voltage prevents the diodes 68 and 70 (and hence the series-coupled resistor 56) from "leaking" during normal superconductive operation of the superconducting magnet 10. However, such "leaking" is relatively small and may be tolerated in many magnet applications.

It is noted that the four superconductive-coil portions may be abutting, spaced-apart, or any combination thereof. It is further noted that a coil portion may comprise one or more abutting or spaced-apart coil sub-portions (not shown in the figures). Preferably, and generally speaking, for magnetic purposes superconductive-coil portions 18 and 20 are (generally) identical, and superconductive-coil portions 22 and 24 are (generally) identical. Preferably however, for quench protection purposes, superconductive-coil portions 20 and 22 are closely associated electrically, and superconductive-coil portions 18 and 24 are closely associated electrically.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A superconductive-magnet electrical circuit comprising:

a) a superconductive-coil assemblage including first, second, third, and fourth superconductive-coil portions together having a total electrical impedance, wherein said second superconductive-coil portion is coupled in series with and between said first and third superconductive-coil portions, wherein said third superconductive-coil portion is coupled in series with and between said second and fourth superconductive-coil portions, wherein said first superconductive-coil portion abuts said second superconductive-coil portion, wherein said third superconductive-coil portion abuts said fourth superconductive-coil portion, and wherein said third and fourth superconductive-coil portions are spaced apart from said first and second superconductive-coil portions;

b) a bipolar current-bypass electrical-circuit element having a first terminal, a second terminal, and an electrical impedance less than generally one-thousandth of said total electrical impedance, wherein said bipolar current-bypass electrical-circuit element is coupled to said superconductive-coil assemblage only through said first and second terminals, wherein said first terminal is only coupled to said superconductive-coil assemblage in parallel with said first and second superconductive-coil portions, and wherein said second terminal is only coupled to said superconductive-coil assemblage in parallel with said third and fourth superconductive-coil portions; and c) a resistor having a first lead and a second lead, wherein said first lead is coupled in parallel with said second and third superconductive-coil portions.

2. The circuit of claim 1, wherein said second lead is coupled with said first and fourth superconductive-coil portions.

3. The circuit of claim 2, wherein said superconductive-coil assemblage has a critical-design voltage and an operating current, and wherein said resistor has a resistance less than said critical-design voltage divided by said operating current.

4. The circuit of claim 3, wherein said bipolar current-bypass electrical-circuit element consists of first and second diodes opposingly coupled together in parallel.

5. The circuit of claim 1, also including a bipolar semiconductor switch having two electrodes, wherein said second lead of said resistor is coupled in series with one of said two electrodes.

6. A superconductive-magnet electrical circuit comprising:

a) a superconductive-coil assemblage including first, second, third, and fourth superconductive-coil portions together having a total electrical impedance, wherein said second superconductive-coil portion is coupled in series with and between said first and third superconductive-coil portions, and wherein said third superconductive-coil portion is coupled in series with and between said second and fourth superconductive-coil portions;

b) a bipolar current-bypass electrical-circuit element having a first terminal, a second terminal, and an electrical impedance less than generally one-thousandth of said total electrical impedance, wherein said bipolar current-bypass electrical-circuit element is coupled to said superconductive-coil assemblage only through said first and second terminals, wherein said first terminal is only coupled to said superconductive-coil assemblage in parallel with said first and second superconductive-coil portions, and wherein said second terminal is only coupled to said superconductive-coil assemblage in parallel with said third and fourth superconductive-coil portions;

c) a resistor having a first lead and a second lead, wherein said first lead is coupled in parallel with said second and third superconductive-coil portions; and d) a bipolar semi-conductor switch having two electrodes, wherein said second lead of said resistor is coupled in series with one of said two electrodes, and wherein the other of said two electrodes is coupled in parallel with said first and fourth superconductive-coil portions.

7. The circuit of claim 6, wherein said bipolar semiconductor switch consists of third and fourth diodes opposingly coupled together in parallel.

8. The circuit of claim 7, wherein said third and fourth diodes are generally identical.

9. The circuit of claim 8, wherein said superconductive-coil assemblage has a critical-design voltage and an operating current, and wherein said resistor has a resistance less than said critical-design voltage divided by said operating current.

10. The circuit of claim 9, wherein said third diode has a forward bias voltage of between generally two volts and generally ten volts at a temperature of generally ten Kelvin.

* * * * *